(12) United States Patent
Naftel (10) Patent No.: US 10,089,186 B1
(45) Date of Patent: *Oct. 2, 2018

(54) METHOD AND APPARATUS FOR FILE BACKUP

(71) Applicant: Veritas Technologies LLC, Mountain View, CA (US)

(72) Inventor: Timothy Naftel, Mountain View, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,454

(22) Filed: Sep. 16, 2015

Related U.S. Application Data (62) Division of application No. 13/738,916, filed on Jan. 10, 2013, now Pat. No. 9,152,638.

(51) Int. Cl.
| | | |
|---|---|---|
| *G06F 7/00* | (2006.01) | |
| *G06F 17/00* | (2006.01) | |
| *G06F 11/14* | (2006.01) | |
| *G06F 17/30* | (2006.01) | |
| *G06F 9/455* | (2018.01) | |

(52) U.S. Cl.
CPC ...... *G06F 11/1451* (2013.01); *G06F 9/45558* (2013.01); *G06F 17/30106* (2013.01); *G06F 17/30233* (2013.01); *G06F 2009/45583* (2013.01); *G06F 2201/84* (2013.01)

(58) Field of Classification Search
CPC ......... G06F 17/30106; G06F 17/30233; G06F 11/1451; G06F 9/45558; G06F 2009/45583; G06F 2201/84
See application file for complete search history.

(56) References Cited

U.S. PATENT DOCUMENTS

| | | | |
|---|---|---|---|
| 7,171,523 B2 | 1/2007 | Yamasaki | |
| 7,370,164 B1 | 5/2008 | Nagarkar et al. | |
| 7,873,601 B1 * | 1/2011 | Kushwah | G06F 11/1451 707/654 |
| 8,005,797 B1 * | 8/2011 | Chepel | G06F 11/1451 707/649 |
| 8,671,075 B1 | 3/2014 | Xing et al. | |
| 8,856,486 B2 | 10/2014 | Sharp et al. | |
| 8,990,162 B1 * | 3/2015 | Kushwah | G06F 11/1469 707/646 |
| 9,135,118 B2 | 9/2015 | Skillcorn et al. | |
| 9,152,638 B1 * | 10/2015 | Naftel | G06F 17/3007 |
| 9,158,804 B1 * | 10/2015 | Rangapuram | G06F 17/30575 |
| 2014/0143220 A1 * | 5/2014 | Foster | G06F 17/30091 707/705 |

* cited by examiner

*Primary Examiner* — Azam Cheema
(74) *Attorney, Agent, or Firm* — Patent Law Works LLP (57) ABSTRACT

A file backup method, which can be implemented on a virtual machine system or applied to backup files of a virtual machine, is herein described. The virtual machine system may include a virtual machine server and be associated with a backup server. Changes to a storage media are tracked through change block tracking. A location where file system records reside on the storage media is identified. Changed file system records are identified among the tracked changes to the storage media. Copies are made of the files that the changed file system records are pointing to.

20 Claims, 5 Drawing Sheets

METHOD AND APPARATUS FOR FILE BACKUP

BACKGROUND

Storage media, such as disks in hard drives, should be backed up regularly to protect against data loss or corruption. There are many known systems and methods for backing up computers. Backup types include a full backup, which is a copy of all files associated with a specified machine or system, a differential backup, which is a backup or copy of the files that have changed since the last full backup, and an incremental backup, which is a backup or copy of files that have changed since the previous incremental backup or full backup, whichever is most recent. The terms differential backup and incremental backup are sometimes used interchangeably. Well-known methods for personal computers involve the use of file modification time or archive bits, which are attributes of a file system record. A file that has been changed since a previous backup has an updated modification time and archive bit set. Once the file is copied, for a backup, the archive bit may be cleared. Determining which files to copy requires looking through the entire file system records to find which files have an updated modification date or archive bits set. For a single user computer of modest storage size, this is not a major burden. However, for enterprise systems, especially those employing virtualization, looking through all of the file system records to determine which files have modification date has been updated or set archive bits is a time-consuming task. Also, there are reliability issues, since the archive bits may be user accessible.

In one embodiment, A backup systems for virtual environments will generate a map all of the files and data within a virtual environment and then back up the map and the data according to the map. This methodology is used for full backups, incremental backups and differential backups. A sequential scan of the file system indexes of every file system within the virtual environment is performed, in order to generate the map. In the case of an incremental or a differential backup, the generation of the map can take more time than the backup of the actual data. Therefore, there is a need in the art for a solution which overcomes the drawbacks described above.

SUMMARY

A computer implemented file backup method and system and embodiments thereof are herein disclosed. Change block tracking is applied by a hypervisor to track changes to a virtual disk. File system records are identified in the blocks of the virtual disks. Only the file system records identified by the intersection of the file system record blocks and the change block tracking are examined to identify changed files. Then those files identified as modified are included into the differential or incremental map for backup.

In one embodiment a file backup method is provided. The file backup method includes requesting a listing of changed blocks or sectors to a storage media and receiving the listing of changed blocks or sectors in response to the requesting, wherein the listing of changed blocks or sectors identifies a storage media location for each change. The method includes identifying a file system type for files stored on the storage media and identifying a location where file system records reside on the storage media based on the identified file system type. The method includes comparing the storage media location for each change with the locations where file system records reside and examining only those file system records for changed files, wherein at least one method operation is executed through a processor.

In one embodiment, a file backup method for systems employing virtualization is provided. The method includes determining a file system type for file system records stored on a virtual disk of a virtual machine and identifying first disk regions on the virtual disk where the file system records reside. The method includes receiving a change list identifying second disk regions on the virtual disk and determining an intersection of the first disk regions and the second disk regions. The method includes examining only file system records from the intersection of the first disk regions and the second disk regions and copying only changed files in accordance with the changed file system records, wherein at least one operation is executed through a processor.

In one embodiment, a file backup system is provided. The file backup system includes a virtual machine manager configured to indicate changed blocks on a virtual disk and a backup server configured to communicate with the virtual machine manager. The backup server has a processor and the processor is operable to execute instructions causing the processor to receive a change list from the virtual machine manager, where the change list indicates the changed blocks on the virtual disk. The processor is further operable to determine a location of changed file system records residing on the virtual disk, identify disk regions common to the location of the changed file system records and common to the change list. The file system records of the identified disk regions are then examined and only changed files are copied for the backup.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of a file backup system, a file backup method, a method for backing up files and a virtual machine system with file backup are herein described. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The embodiments described below utilize optimized index mapping to achieve the differential and incremental backups in an efficient manner. In some embodiments, optimized index mapping takes advantage of change block tracking to determine if a file system index needs to be processed for a backup operation. The optimized index mapping comes about because, unlike other known methods, all of the file system indexes are not examined. Under optimized index mapping, only file system records within the changed block regions are examined. Thus, through the system or method described herein, the file system indexes that have changed are examined, rather than examining all file system indexes. For file systems like NTFS (New Technology File System) where MFT (Master File Table) records are stored in large sequential extents on a disk, the MFT records that need to be processed can be determined based on the changed blocks on the disk (or disks). It should be appreciated that the embodiments are not limited to a certain file system type, such as NTFS, as the embodiments may be extended to any file system type, such as the Unix file system (UFS), the Linux extended file system (ext2, ext3, ext4), etc.

Figure 1:
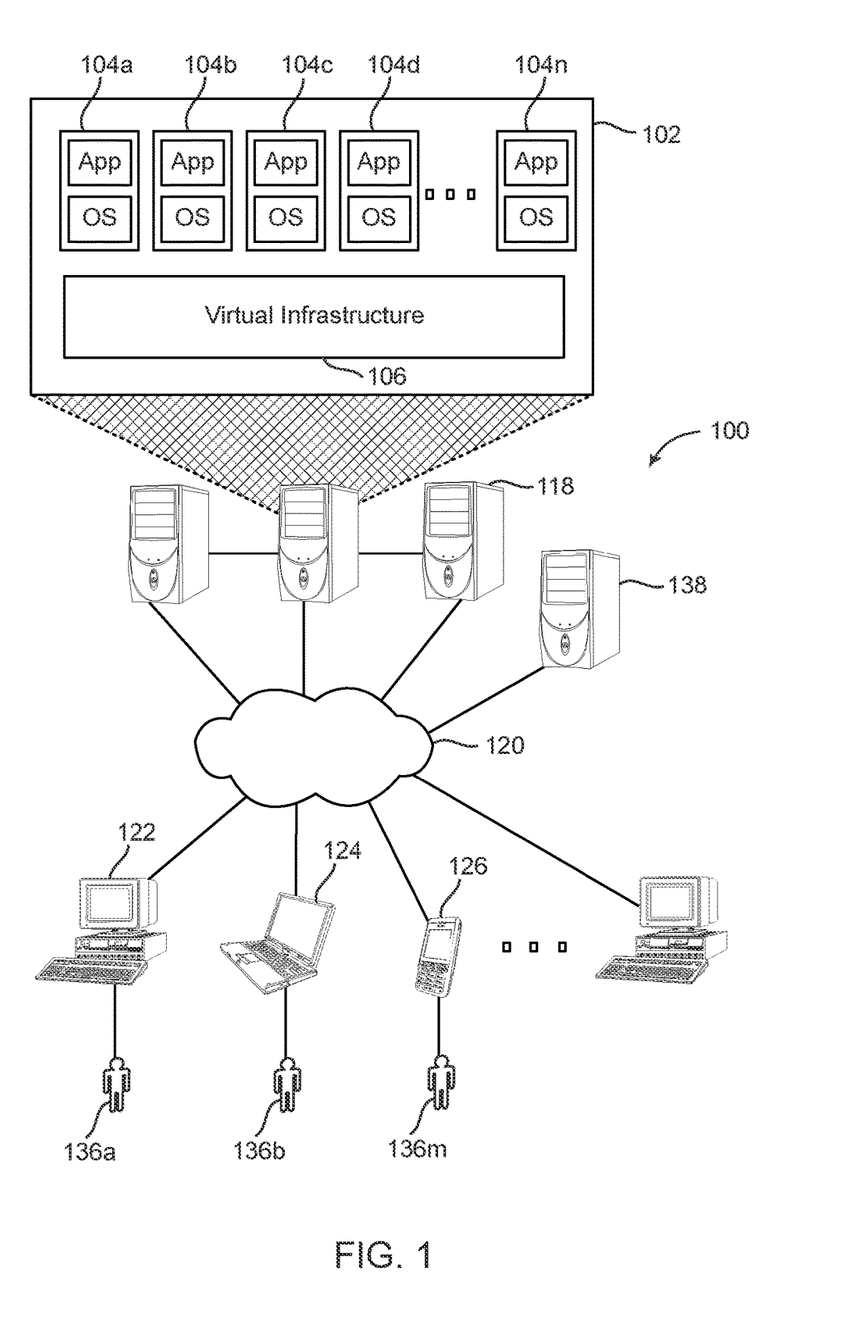
FIG. 1 is a system diagram illustrating the architecture for an enterprise system utilizing virtualization and having backup capabilities in accordance with some embodiments.

FIG. 1 is a system diagram illustrating the architecture for an enterprise system utilizing virtualization and having backup capabilities in accordance with some embodiments. The backup system 100 is integrated into a virtualization environment supported by enterprise servers 118, according to one embodiment. The environment depicted in FIG. 1 includes enterprise servers 118 that provide virtual desktop services to remote users 136a-m. Although embodiments of the present invention are described within a virtual environment, the embodiments may be integrated into other non-virtualized environments.

In one embodiment, backup server 138 is connected to the network 120 and can perform backups for the enterprise servers 118 and/or the computing devices 122, 124, 126. A simplified architecture of virtualization server or virtual machine server 102 is shown in FIG. 1, with some components omitted for simplification purposes. Virtual infrastructure layer 106 manages the assignment of virtual machines (VM) 104a-n in enterprise server or virtual machine server 102 to remote users. Computing devices 122, 124 and 126 act as clients in the virtual infrastructure and these computing devices provide display presentation and input/output capabilities associated with virtual machines 104a-n. The clients include PC 122, laptop 124, PDA, mobile phone 126, in this embodiment. The clients communicate with virtualization server 102 via network 120. Virtual machines 104a-n include a Guest Operating System (GOS) supporting applications running on the GOS.

It should be appreciated that the VMs 104a-n, which may be referred to as a "virtual computer," are often a software implementation of a complete computer system. In the VM, the physical system components of a "real" computer are emulated in software, that is, they are virtualized. Thus, the VMs 104a-n will typically include virtualized ("guest") system hardware, which in turn includes one or more virtual central processing units (VCPUs), virtual system memory (VMEM), one or more virtual disks (VDISK), and one or more virtual devices, all of which are implemented in software to emulate the corresponding components of an actual computer. The concept, design and operation of virtual machines are well known in the field of computer science. For some embodiments, the virtual machines 104a-n are implemented using the ESX Server product manufactured and distributed by VMware, Inc., Palo Alto, Calif. However, this is not meant to be limiting as alternative virtualized computer system architecture may be integrated with the embodiments described herein.

Figure 2:
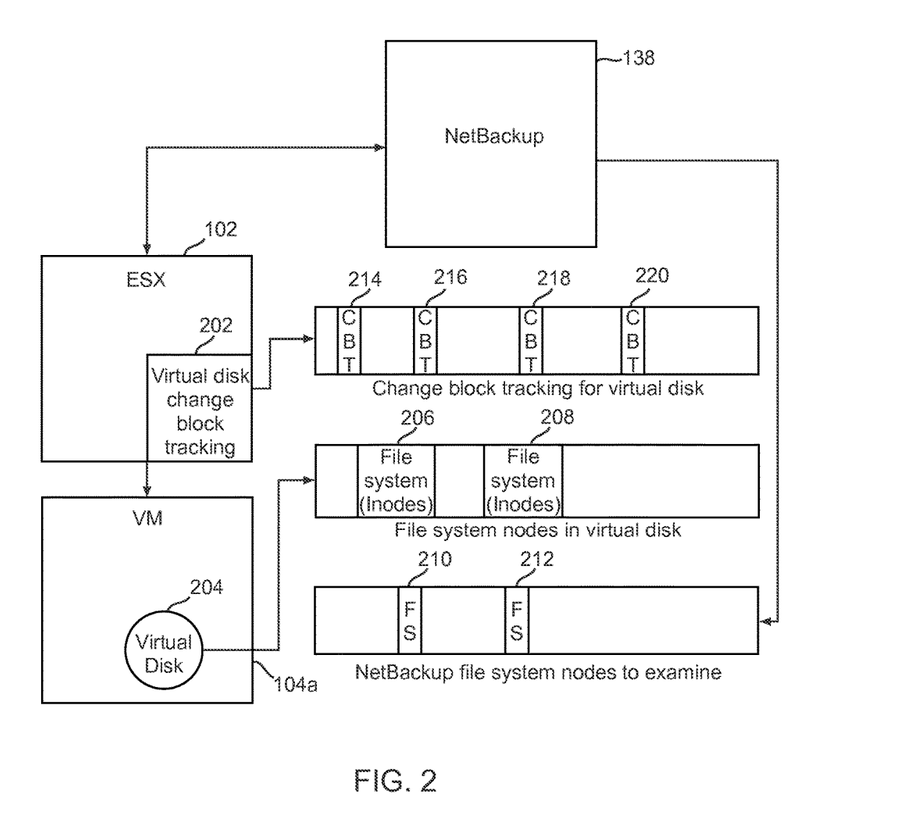
FIG. 2 is a system diagram illustrating a virtual infrastructure communicating with a backup system in accordance with some embodiments.

FIG. 2 shows details of a virtual machine 104a, as implemented on a virtual machine server or enterprise server 102, which may be referred to as a hypervisor. A change block tracking module 202 is executing on the enterprise server or virtual machine server 102. In some embodiments virtual machine server 202 may be the ESX server mentioned above and or managed through a vCenter server. In the embodiment shown, the change block tracking module 202 contains code that when executed through a processor, performs the functionality that identifies blocks that have changed on virtual disk 204 from a given time interval, as managed on the virtual machine server 102. In some embodiments the change block tracking process 202 may be applied to a physical disk.

In the system shown in FIG. 2, a backup process executing on the backup server 138 communicates with the virtual machine infrastructure, for example by communicating with the enterprise server or virtual machine server 102. In some embodiments backup server 138 executes the NET-BACKUP™ software owned by the assignee. The communication between backup server 138 and virtual machine server 102 may be an inquiry to determine the blocks that have changed on the virtual disk from a given time interval. For example, an identifier generated from a most recent full backup or most recent incremental backup may be stored by backup server 138. This identifier is supplied to virtual machine server 102. The identifier designates one or more virtual machines for the backup operation and provides a timestamp or time interval for identifying changed files for the backup process. The backup process, executing on the backup server 138, also communicates with the virtual machine infrastructure to open the virtual disk 204 of virtual machine 104a, to determine where the file system records 206 and 208 reside. In some embodiments, the file system records may be inodes on Linux or MFT records of a WINDOWS™ operating system. It should be appreciated that an algorithm that parses the raw drives of the virtual machine may determine the file system types in some embodiments. The backup process, executing on the backup server 138, then uses the intersection or union of the change block tracking sectors 214, 216, 218, 220, and the file system nodes 206 and 208 to determine the file system records 210 and 212 that need to be examined for the backup. Those files identified as changed are then backed up. Once the backup process is completed, the virtual infrastructure generates another identifier for this most recent backup which is sent to the backup server 138 for storage. This identifier can then be used for the next successive backup operation and this process is repeated as needed. It should be appreciated that rather than examine all of the sectors that have changed during the time interval, the embodiments identify a subset of those sectors that have relevant changes in order to more efficiently perform an incremental or differential backup.

Figure 3:
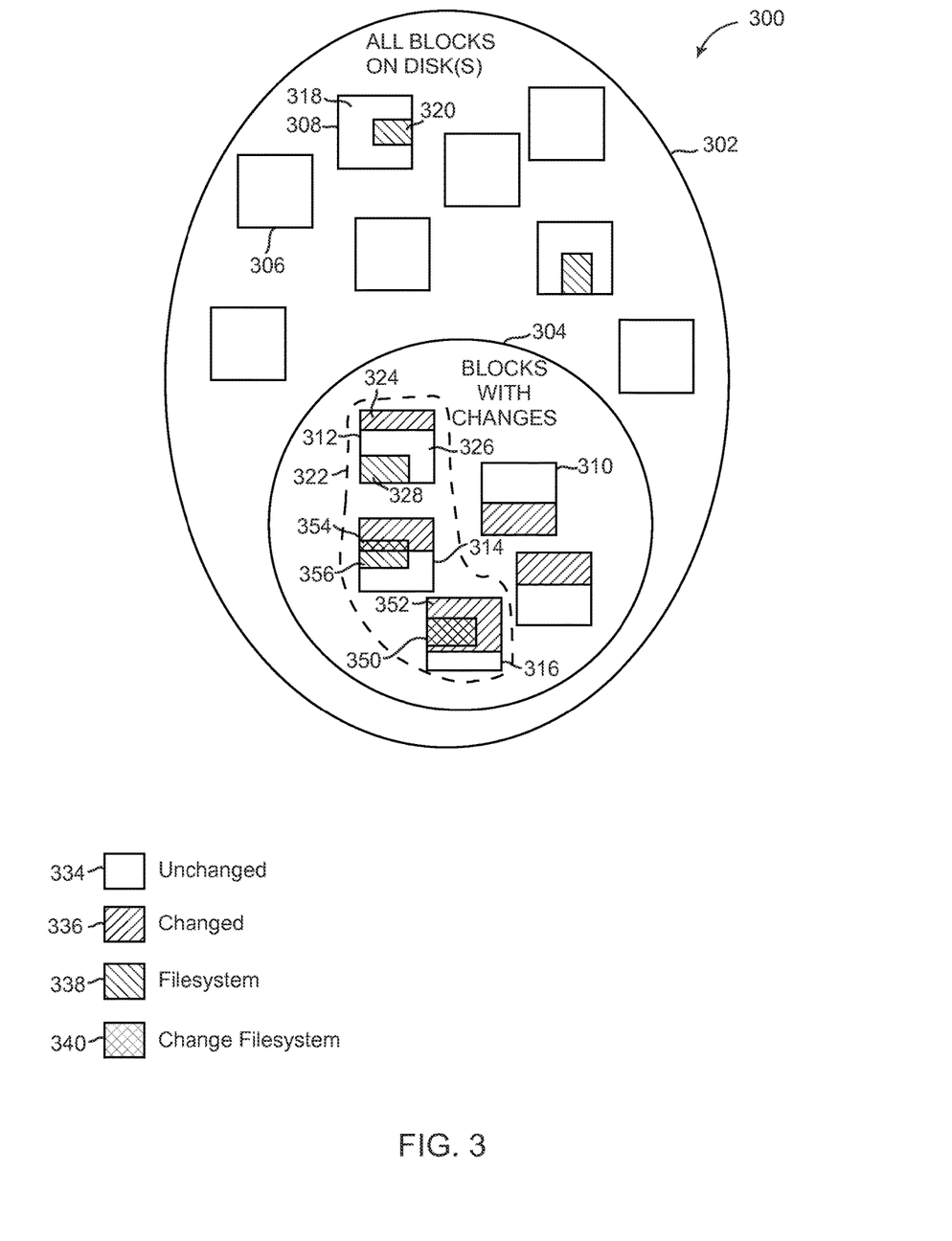
FIG. 3 is a diagram showing a relationship among file system records, blocks of a storage media, and changes to the records or files of the blocks in accordance with some embodiments.

FIG. 3 symbolically illustrates blocks or other regions, e.g., sectors, on a disk or disks, or other storage media for a computing system. These disks may be virtual disks, such as virtual disk 204 and/or physical disks, in some embodiments. It should be appreciated that FIG. 3 is a set theory diagram 300, and that the physical locations of blocks or other regions on storage media and the organization of file system records and other data to an operating system and applications is implementation dependent. A legend shows shadings 334, 336, 338, 340 that represent the status of records or data for a given block of the storage media. Shading 334 indicates unchanged regions of a block, i.e., regions that have not had any changes since the last full backup or incremental backup, depending on the type of change being tracked. In some embodiments, a region with absence of any shading marks is a region without file system records and this region is an unchanged region in a block. Shading 336 indicates changed regions of a block, i.e., regions in a block that have had at least one change since the last full backup or incremental backup. Shading 338 indicates file system records, i.e., regions in a block that have file system records. Shading 340, shown as crisscrossed marks, indicates changed file system records in a block, i.e., the shading is the intersection or union of changed regions 336 and file system records 338. It should be appreciated that the union of unchanged, non-file system records regions having the shading 334 and unchanged file system records regions having the shading 338 is an unchanged region.

Continuing with FIG. 3, set 302 of all blocks on the disk(s) or other storage media includes blocks 306 and 308 that are unchanged and have no regions with the shading 336, and blocks 310, 312, 314, 316 that have changes as identified by regions with the shading 336. In some embodiments for a system that is routinely backed up, there will be many more unchanged blocks 306 and 308 than changed blocks 310, 312, 314, 316. File system records, shown as regions with the shading 338 or the shading 340, show up on various blocks throughout the set 302 of all blocks on the disk(s) or other storage media. For example, some of the unchanged blocks 306 and 308 have unchanged file system records as illustrated by region 320 with the shading 338 on block 308, with the remainder of block 308 shown as an unchanged region 318 with shading 334. Some of the blocks with changes, such as blocks 310, 312, 314, and 316, have file system records, such as the unchanged file system records in region 328 in an unchanged region 326 of block 312, and the changed file system records 354 and 350 of blocks 314 and 316, respectively. It should be appreciated that in some embodiments for a system that is regularly backed up there will be many more file system records that are unchanged than changed.

The set 302 of all blocks on the disk(s) or other storage media includes a set 304 of blocks with changes, i.e., changed blocks 310, 312, 314, 316. Some of these blocks, such as blocks 312, 314, 316 include file system records, while other blocks 310 do not include file system records. The changed blocks that include file system records form subset 322. Some of the blocks in the subset 322, such as block 312, have unchanged file system records 328 but have a changed region 324 that does not overlap or intersect with the file system records, e.g., the changed region 324 may include changed data other than file system records. Some of the blocks in the subset 322, such as block 316, have changed file system records 350 in complete overlap with a changed region 352 of the block 316. Some of the blocks in the subset 348, such as block 314, have a changed portion of the file system records 354 and an unchanged portion of the file system records 356. The preceding examples of relationships among file system records, blocks and changed blocks are readily interpreted with regard to sectors, blocks and other regions on virtual disks and/or physical hard drive disks or other storage media.

An algorithm for finding, locating or determining the changed file system records, where the changed file system records point to files to be backed up, provides information useful that enables performing a differential or incremental backup more efficiently. It should be appreciated that the embodiments of the algorithm can apply to a plurality of disks or a single disk. Alternative storage media may be utilized with the embodiments besides a disk. Changes to the blocks 302 or other regions on the disk are tracked, for example by applying change block tracking across all of the blocks on the disk to track changes. The algorithm described herein identifies blocks with changes and determines which blocks have file system records to form a subset 322. For example, the intersection or union between the set of blocks that have file system records, i.e., blocks 308, 312, 314, 316, and the set of blocks that have changes, i.e., 310, 312, 314, 316 yields subset 322. From subset 322, that includes blocks 312, 314, and 316, the algorithm extracts or identifies the changed file system records 354 and 350. The changed file system records 354 and 350 point to file system records to be examined for backed up through an appropriate backup agent such as the NETBACKUP™ module of the assignee. It should be appreciated that by following the algorithm described below in further detail, the backup system looks at a subset of the file system records and does not need to sequentially analyze all of the file system records, thereby efficiently performing the incremental or differential backup.

Figure 4:
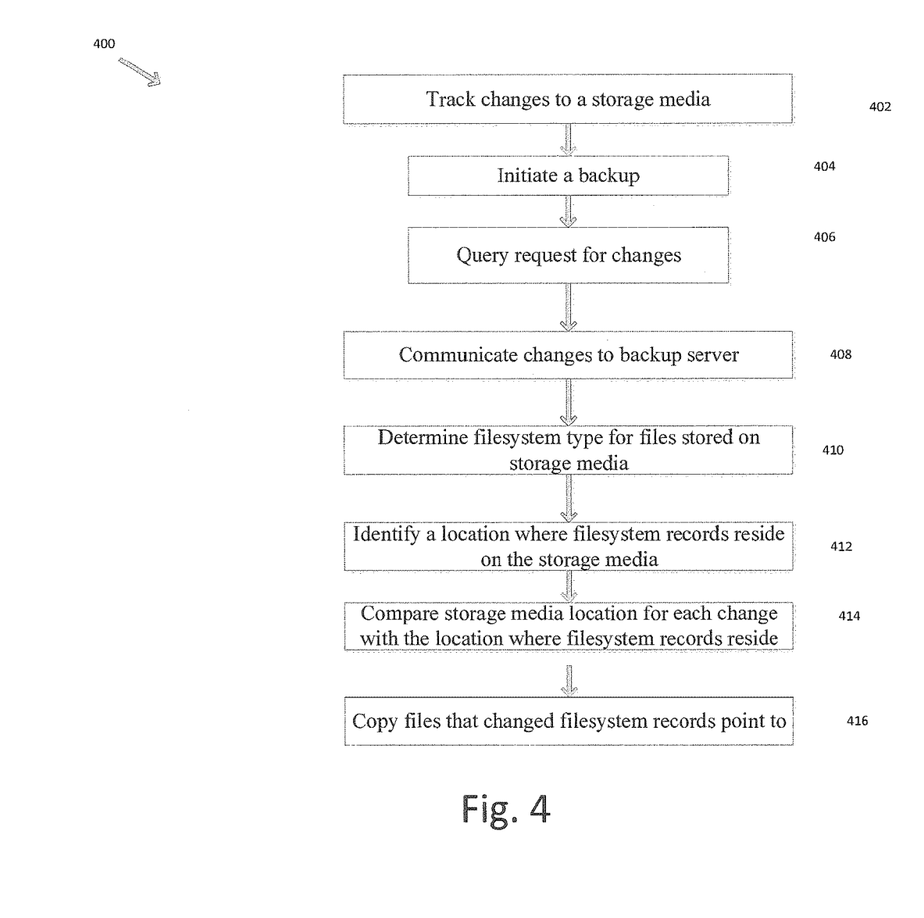
FIG. 4 is a flow diagram showing embodiments of a method for backing up files in accordance with some embodiments.

A file backup method 400 is shown in FIG. 4. Changes to blocks or sectors of a storage media are tracked in operation 402. In one embodiment, the changes are tracked to a first granularity that is greater than a minimum file size. For example, the changes can be tracked to a granularity associated with a size of one block. It should be appreciated that this differs from the use of an archive bit which tracks changes to a granularity of a minimum file size. A file size can range from much smaller than a block to a size that spans many blocks. As another example, the changes can be tracked to a granularity of a region of a disk, with a minimum file size being less than the region of the disk. It should be appreciated that the changes may be tracked through a change block tracking algorithm. In operation 404, a backup is initiated. The backup may be initiated in response to a policy, a schedule, or a request. The policy, schedule or request may be automated or initiated by a user. In response to the backup being initiated, the method proceeds to the operation 406, where a query is sent to a first server. In some embodiments the query is a request for changes to the storage media of the first server. As discussed above with reference to FIG. 2, the first server may be a virtual server and employ change block tracking where changes to files are tracked over a time interval. In one embodiment, the query to the first server references a specified virtual machine and time stamp. For example, an identifier correlated to a virtual machine and a time is provided to the first server. In a virtualization environment, the identifier may be supplied to a vCenter server of VMWARE™ in some embodiments.

In one embodiment, the query to the first server includes a specified time point or time interval. For example, the query can be a request for information about changes to the storage media that have occurred since the specified time point or during the specified time interval, and that involve a specified virtual machine. The method advances to operation 408 where information about the changes to the blocks or sectors is communicated, for example from the first server to a second server issuing the query, such as a backup server. In operation 410 a file system type for files stored on the storage media of the first server is identified. The file system type may be identified through a parsing operation or mounting operation upon opening one or more virtual disks associated with the first server. The method then advances to operation 412 where a location is identified where the file system records reside on the storage media of the first server. In one embodiment, the location where the file system records reside on the storage media is identified to a second granularity, for example a granularity that is finer than the first granularity, i.e., finer than block size granularity. More specifically, in one embodiment the location of where the file system records reside is identified within a block. The location may be identified in some embodiments by parsing records obtained as a result of opening the disk, mounting the file system, reading a master file table, etc.

Continuing with FIG. 4, the method proceeds to operation 414 where the storage media location for each change is compared with the location where file system records reside. Here, the union or intersection of the location of the changes tracked in operation 402 and the location where the file system records reside as identified in operation 412 is generated. Thus, the comparison process enables any file system records that are in changed blocks or are in changed regions of the storage media to be identified and/or extracted. In operation 416, examines the file system records with the changed regions to determine which files are changed and adds them to the incremental backup map. It should be appreciated that the union or intersection of the file system records generated in operation 414 are the only files examined for backed up. As a result of the processing described above the sequential processing of all the files to determine whether the file has changed and whether the file is a file system record is eliminated so that the changed file system records are readily identified to more efficiently perform a differential or incremental backup.

Figure 5:
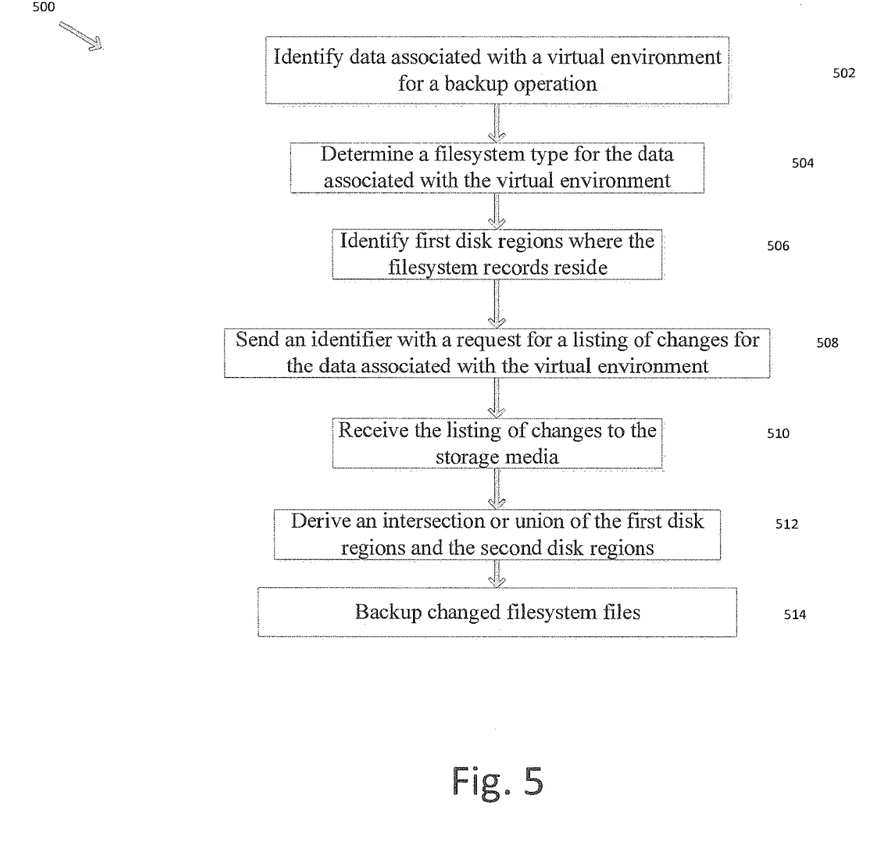
FIG. 5 is a flow diagram showing embodiments of a method for backing up files for a system employing virtualization in accordance with some embodiments.

A file backup method 500 for virtual machines is shown in FIG. 5. In operation 502, data associated with a virtual environment is identified for a backup operation. As mentioned above, the backup operation may be triggered by a policy, a schedule or a user request. The method advances to operation 504 where a file system type for the data associated with the virtual environment is determined. In some embodiments the file system is mounted or the partition tables are read to determine the file system type. In operation 506 first disk regions are identified where the file system records reside. For example, the first disk regions are identified as illustrated with reference to regions or sectors 206 and 208 of FIG. 2. It should be appreciated that the identifying of the first disk regions may be performed contemporaneously with the reading of the partition tables of the disk or mounting the file system as the pointers to the location of the file system records may be identified during the mounting or parsing operations. In operation 508, an identifier is sent with a request for a listing of changes for the data associated with the virtual environment. The identifier pertains to a virtual machine and a time in some embodiments. The time may include a timestamp, a time window or a timeslot. In these cases, the changes include changes to records or data that have occurred since the timestamp or during the time window or timeslot. In one embodiment, the identifier is sent to a virtual machine server, such as a vCenter server having access to the virtual disk and/or the actual disk.

The method then proceeds to operation 510 where the listing of changes to the storage media is received. The listing of changes indicates second disk regions having changes. As noted above, the listing of changes is received from the virtual machine server in response to sending the identifier to the virtual machine server. In some embodiments, the listing of changes is tracked through a change block tracking algorithm mentioned with reference to FIG. 2. The change block tracking algorithm tracks the changes since the most recent full backup operation or latest incremental backup. In some embodiments, after each full backup or incremental backup an identifier is generated and saved so that a next backup operation can use that identifier as a reference point in time. With reference to FIG. 2, the second disk regions may be represented by regions or sectors 214, 216, 218, and 220. Continuing with FIG. 5, the method moves to operation 512 where an intersection or union of the first disk regions and the second disk regions is derived. The changed file system records are then extracted from the intersection of the first and second disk regions. With reference to FIG. 2, regions or sectors 210 and 212 are identified as the union or intersection of sectors 214, 216, 218, and 220 and sectors 206 and 208. Thus, the file system records for sectors 210 and 212 are then examined to determine if any of the files need to be backed up for the differential or incremental backup operation. Returning to FIG. 5, the changed files are copied or backed up in operation 514. It should be appreciated that the embodiments enable the efficient backup of large enterprise systems, e.g., systems having at least 500,000 files and directories by avoiding a full sequential scan of all the file system records for an incremental and/or differential backup. It should be further appreciated that the embodiments may be applied to smaller systems having less than 500,000 files and directories to also appreciate efficiencies in the backing up of files.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, hardware processors, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A file backup method, comprising:
   receiving a listing of changed blocks, wherein the listing of changed blocks identifies a storage media location for each change;
   identifying a file system type for file system records residing on the storage media;
   identifying a location where the file system records reside on the storage media based on the identified file system type;
   comparing the storage media location for each change with the location where file system records reside; and
   examining the changed file system records based on the comparing to determine which files should to include in the file backup, the examining comprising:
      identifying an intersection between the location where file system records reside and the listing of changed blocks; and
      sorting among the changed file system records and unchanged data at the identified intersection.

2. The file backup method of claim 1, wherein the method comprises:
   providing an identifier representing a time point for a most recent full backup of the storage media.

3. The file backup method of claim 2, wherein the identifier is a timestamp.

4. The file backup method of claim 1, wherein the storage media is integrated into a virtualized storage environment.

5. The file backup method of claim 1, wherein the storage media includes a virtual disk of a virtual machine.

6. The file backup method of claim 1, wherein:
   identifying the location where the file system records reside includes reading one of master file table or inodes.

7. The file backup method of claim 1, wherein the identifying the file system type includes parsing the file system.

8. The file backup method of claim 1, wherein the identifying the file system type includes mounting the file system.

9. The file backup method of claim 1, wherein the copying is one of a differential backup or an incremental backup from a most recent full backup of the storage media.

10. The file backup method of claim 1, further comprising backing up the determined changed file system records.

11. A non-transitory computer readable medium containing instructions for causing
   a computer to perform a method, the method comprising:
      receiving a listing of changed blocks, wherein the listing of changed blocks identifies a storage media location for each change;
      identifying a file system type for file system records residing on the storage media;
      identifying a location where the file system records reside on the storage media based on the identified file system type;
      comparing the storage media location for each change with the location where file system records reside; and
      examining the changed file system records based on the comparing to determine which files should to include in the file backup, the examining comprising:
         identifying an intersection between the location where file system records reside and the listing of changed blocks; and
         sorting among the changed file system records and unchanged data at the identified intersection.

12. The medium of claim 11, wherein the method comprises:
   providing an identifier representing a time point for a most recent full backup of the storage media.

13. The medium of claim 12, wherein the identifier is a timestamp.

14. The medium of claim 11, wherein the storage media is integrated into a virtualized storage environment.

15. The medium of claim 11, wherein the storage media includes a virtual disk of a virtual machine.

16. The medium of claim 11, wherein:
identifying the location where the file system records reside includes reading one of master file table or inodes.

17. The medium of claim 11, wherein the identifying the file system type includes parsing the file system.

18. The medium of claim 11, wherein the identifying the file system type includes mounting the file system.

19. The medium of claim 11, wherein the copying is one of a differential backup or an incremental backup from a most recent full backup of the storage media.

20. The medium of claim 11, wherein the method further comprises backing up the determined changed file system records.

\* \* \* \* \*